Dec. 15, 1936.　　　A. R. WHITE　　　2,064,097
OIL REFINER
Filed Oct. 23, 1934
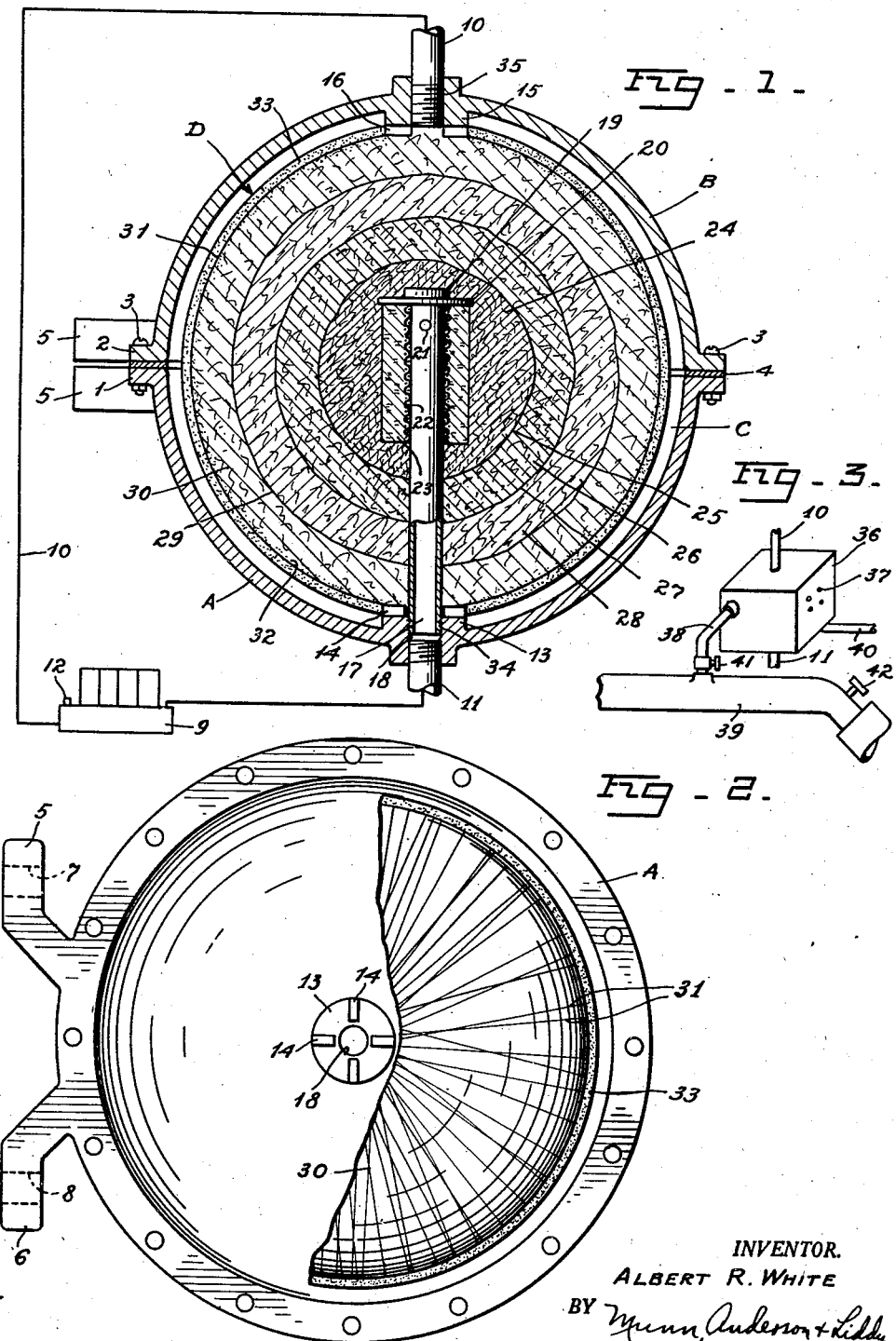
INVENTOR.
ALBERT R. WHITE
BY Munn, Anderson + Liddy
ATTORNEYS.

Patented Dec. 15, 1936

2,064,097

UNITED STATES PATENT OFFICE 2,064,097

OIL REFINER

Albert R. White, Glendale, Calif.

Application October 23, 1934, Serial No. 749,629

2 Claims. (Cl. 210—131)

My invention relates to improvements in oil refiners, and it consists of the combinations, constructions and arrangements hereinafter described and claimed.

An object of my invention is to provide an improvement over the form of the device shown in my patent on a crank case cleaner, No. 1,976,273 issued October 9, 1934. In the patented device I show an oil refiner in which the oil is caused to flow through a compound and thus to be refined. A screen was used, and this screen flexed during the varying pressures of oil, and due to the flexing a better refining of the oil was accomplished.

In the present form of the device I also make use of a screen, and I dispose this screen around a central outlet pipe. The varying pressures of oil cause the screen to flex, and it is this flexing which keeps the cleaning material from packing around the outlet pipe. The result is that the device will function properly throughout its entire life.

A further object of my invention is to provide a device of the type described in which the casing is made in the shape of a sphere instead of being box-shaped as shown in my patent. It is obvious that the spherical shape can be changed to a cylindrical one if desired, but I have found that a sphere will afford the maximum amount of space for the cleaning material, and at the same time can be placed beneath the hood of an automobile where it is impossible to place a device having a cylindrical shape, or a rectangular shape.

The device is designed to cause all of the oil to pass entirely through the refining material from the outer surface thereof to the interior where the outlet pipe is located, and the oil in passing through the material will give up its impurities to the refining compound. This compound when filled with impurities changes in specific gravity so that it will drop to the bottom of the casing. In this respect the invention differs radically from ordinary filters because in standard filters the foreign material forms a layer on the top of the filtering material and impedes the flow of oil through the filtering material to such a point that finally it is impossible for the oil to pass through the filtering material, and all of it must pass through a by-pass which is provided with the standard filter. The compound, when changing in specific density and dropping to the bottom of the casing, uncovers an under layer of the same compound, which in turn will act upon the oil in the same manner. In this way a self-renewing surface of the compound is provided, and thus the device will efficiently operate throughout its entire life.

The oil in the crankcase through use becomes diluted with gasoline and also contains sludge made up of acid, water, and carbon, these ingredients being mixed with the oil by agitation to form the sludge. The sludge is removed from the oil by coming into contact with the cleaning compound in the oil refiner. The solids in the oil are separated out by coming into contact with the same compound. The compound furthermore is so fine as to separate the gasoline from the oil, thereby freeing the oil of dilution. The gasoline dilution when freed is more volatile and therefore passes more quickly into vapor form from pressure and heat.

This gasoline vapor is formed while the oil is passing from the outer surface of the pack to the interior of the pack where the oil passes into the outlet pipe. This vapor will be carried along with the oil stream in the form of bubbles and although some of the vapor may be reabsorbed in the oil as it passes back to the crankcase, the rest will pass into the crankcase as vapor and will escape through the breather pipe. It is also possible that all of the sludge and gasoline will not be removed the first time the oil passes through the refiner, but the constant repassage of the oil through the device will refine it. It is also possible that some of the vapor in passing through the pack will rise to the top of the device, but the remainder will be carried by the continual flow of oil out through the outlet pipe.

I dispose a loofah sponge around the outlet pipe and this will absorb the water, but will allow the oil to pass therethrough. The water in the sponge will vaporize and although a portion of the water vapor will remain in the casing, the remainder will be carried by the oil stream back to the crankcase where the vapor will pass out through the breather pipe. The repeated passage of the oil through the sponge will gradually remove all of the water from the oil even though a part of the water vapor should be reabsorbed back into the oil as it flows back to the crankcase.

Since the device will remove all foreign matter the color of the oil will be kept the same as new oil, and the oil will be deodorized, so as to have the same smell as new oil. Furthermore sulphuric acid in the oil is neutralized because of the alkaline substance of the compound, and this retards the corroding of the metal because the acid in the oil which corrodes the metal is removed.

Other objects and advantages will appear in the following specification, and the novel features of the device will be particularly pointed out in the appended claims.

My invention is illustrated in the accompanying drawing forming a part of this application, in which Figure 1 is a vertical section through the device a portion of it being shown in elevation;

Figure 2 is a plan view with the upper half of the casing removed and the filter element partly broken away, and Figure 3 is a schematic view showing a novel means for keeping the casing warm.

In carrying out my invention I provide a casing in the shape of a sphere and this casing has a lower half A and an upper half B. Each half is provided with a flange 1 and 2 respectively, and the flanges are removably secured together by bolts 3. The gasket 4 is placed between the flanges and provides a hermetic seal.

Figure 2 shows how the lower half A carries legs 5 and 6, and bolts or screws not shown are passed through openings 7 and 8 in the legs, and are used for securing the casing to the engine blocks or to the instrument board. The upper half B is likewise provided with legs similar to the legs 5 and 6.

I have shown diagrammatically an engine 9 in Figure 1, and an oil pipe 10 leads from the crank case of the engine to the top of the upper half B. An oil return pipe 11 leads from the bottom half of the casing A to the crank case. The crank case has a breather pipe 12 associated therewith.

Each of the halves A and B is identical in construction. It will be noted that the bottom half has a circular projection 13 with radially extending fins 14 thereon. In like manner the upper half B has a disc-shaped projection 15 with radially extending fins 16 thereon.

Within the compartment C formed by the lower and upper halves A and B I dispose what I term a pack D, and this pack carries the refining material. The pack is removably disposed in the compartment C so that it can be removed from time to time, and the mere renewal of the pack will make the device function as a new device.

I will now describe the special construction of the pack.

An outlet pipe 17 is screwed into the outlet opening 18 in the lower half A. This pipe has a closed top 19, and the top is large enough to act as a stop for a washer 20. The top 19 prevents the washer 20 from being removed off the top of the pipe. The pipe 17 has an opening 21 therein, and this opening is smaller than the inlet opening of the pipe 10.

Around the pipe 17 I dispose a screen 22, and this screen covers the opening 21, and is flexed by the varying oil pressures within the casing.

I further show in Figure 1 a cylinder of sponge-like material 23. This cylinder encloses the cylindrical screen 22 and is designed to permit oil to pass therethrough but to absorb water. I have found that the loofah sponge is particularly adapted to absorb any water, and to permit the oil to pass therethrough. In this way I provide a dehydrating means for the oil.

Around the sponge cylinder 23 I dispose a ball of cellulose material 24 such as cotton. I then wrap this ball with string indicated by the irregular line 25 in Figure 1. I dispose a second layer of cellulose material 26, and this layer is not as fine in texture as the inner layer. The second layer 26 is likewise held together by string indicated at 27. I then dispose a third layer 28 of a cellulose material over the second layer, and this third layer is still coarser or more porous than the second layer. String 29 holds the third layer of material in place. I finally dispose a fourth layer 30 of cellulose material over the third layer, and this fourth layer is the coarsest or the most porous of them all. String 31, see Figure 2, is wrapped around the outer surface of the fourth layer.

I then take a cleaning compound and rub it into the outer layer so that it penetrates an appreciable distance below the outer surface as indicated at 32. I then keep adding the compound to the outer layer of cotton 30 until I build up a layer of compound 33, see Figures 1 and 2. The pipe 17 projects through all of the layers of cotton, and has a threaded end 34 which is removably received in the threaded bore 18. In order to prevent the unscrewing of the pack I provide the fins or projections 14, and these engage with the threads 31 and prevent the rotation of the pack with respect to the lower half A.

The upper half B is now placed upon the pack and is secured to the lower half by the bolts 3. The fins or projections 16 in the upper half not only engage with the strings to stop rotation of the pack within the casing, but also space the pack from the inlet opening 35 in the upper half B. In this way the oil can readily gain access to the interior of the casing.

From the foregoing description of the various parts of the device, the operation thereof may be readily understood.

The oil is pumped from the crank case through the pipe 10 by the usual oil pump not shown. This oil enters the interior of the casing through the inlet opening 35 under pressure and flows over the outer surface of the pack. The particular compound used results in the compound retaining foreign matter, known as sludge, from the oil and permitting the refined oil and any gasoline it may have picked up, to pass on through the pack. It will be noted that all of the oil must pass entirely through the pack before it can enter the return pipe 11 because the only means of access to the pipe 11 is through the opening 21. As already stated, this opening is smaller than the inlet opening 35, and therefore the pressure of oil within the casing will be materially built up. The affinity of the compound for the foreign matter in the oil removes carbon, sand, dust, and metallic substances from the oil. Even some of the oxyhydro-carbons are removed from the oil. As soon as the compound becomes saturated with this foreign material, its specific gravity will change to a point where the compound will drop to the bottom of the casing. This will expose a fresh surface of the compound. In this simple way the pack will present a self-renewing surface to the oncoming oil and there will be no chance of the foreign matter building up a layer on top of the pack which will prevent the flow of oil through the device.

As the oil passes through the pack toward the exit opening 21, it will give up some of its foreign matter. I have already stated that the densities of the different layers of cellulose material progressively increase toward the center of the pack. This will permit the foreign matter to readily pass through the outer layers of the pack, and it will be retained by the innermost layer. It will, therefore, be seen that such foreign matter that is not caught by the compound and dropped to the bottom of the casing will be first caught by the innermost layer of cellulose material 24. As soon as this layer is filled with the foreign material, the next layer will start to fill up. In like manner each succeeding layer will fill up with the foreign material. In this feature the standard operation of an oil filter is reversed because in the usual oil filter the foreign matter builds up a layer on the outside of the filter. In the present invention the foreign matter first builds up on the inside of the pack due to the fact that the outermost layers are more porous than the innermost ones.

In order to prevent the foreign material from packing so closely around the innermost layer 24 so as to prevent the flow of oil out through the exit opening 21, I provide the screen 22, and the flexing of the screen due to the varying oil pressures will keep the pack open to such a point that oil can at all times pass therethrough. The varying oil pressures are caused by the different speeds of the engine, because the different speeds of the engine result in the oil pump operating at different speeds.

The compound frees the sludge from the oil. The compound will retain the sludge and will permit the gasoline to pass into the pack in a free state where it will vaporize more readily. The flow of oil as already stated will carry the vaporized gasoline back to the crankcase where it will escape. The constant repassing of the oil through the refiner will gradually free the oil of gasoline even though some of the gasoline vapor will be reabsorbed by the oil as it passes back to the crankcase.

The sponge will also remove water from the oil and this water will evaporate gradually and will be carried by the oil stream back to the crankcase where it will be liberated. The oil through repeated passings through the sponge will be freed from water even though some of the water vapor will be reabsorbed by the oil as it passes back to the crankcase.

It will be seen that I have provided an oil refiner which will remove water, oil dilution, and all foreign substances from the oil.

After the pack has been used, and it is desired to renew it, it is easy to separate the upper half B from the lower half A, and then to unscrew the used pack from the lower half. A new pack identical to the used one is now screwed into the bore 18. The only difference between the new pack and the used one is that the compound in the new pack is treated with oil so as to form a layer that will adhere to the outer surface of the pack.

In Figure 3 I show a novel means for keeping the casing warm. In cold climates the casing wall may become so cold as to prevent the flow of oil therethrough. In this event I mount the entire device within a box 36. The box is closed on all sides and has openings 37 in one of its walls for receiving the same bolts that are passed through the openings 7 and 8 in the legs 5 and 6. The same bolts secure the box in place that also secure the device in place. A pipe 38 leads from the engine exhaust pipe 39 to the box and an outlet pipe 40 extends from the bottom of the box. A valve 41 is placed in the pipe 38 and the second valve 42 is placed in the exhaust pipe 39. In cold weather the valve 41 can be opened and a part of the exhaust gases will pass through the box and will warm the casing to such an extent as to permit the ready flow of oil through the device.

Figure 3 further shows the oil inlet pipe 10 and the oil outlet pipe 11 extending through the top and bottom walls of the box.

While I have shown only the preferred forms of my invention, it should be understood that various changes or modifications may be made within the scope of the appended claims without departing from the spirit of the invention.

I claim:

1. An article of manufacture comprising a pipe having a threaded end, a ball of filtering material disposed around the pipe and covering the pipe with the exception of the threaded end, the inner end of the pipe being closed, the pipe having an opening in its side wall, a screen enclosing the opening, said filtering material covering the screen, and a sponge enclosing the screen and being enclosed by the filtering material, said sponge removing water from the oil without absorbing any oil.

2. An oil refiner comprising a spherical shaped casing having upper and lower halves, the upper half having an oil inlet and the lower half having an oil outlet, a ball of filtering material designed to fill the casing, said material being held in the shape of the interior of the casing by an open mesh retaining member, a pipe extending from the center of the ball of material and terminating outside of the material, said pipe being receivable in the oil outlet opening, and means disposed at the top and bottom of the interior of the casing for engaging with the open mesh retaining member for preventing the rotation of the filtering material within the casing, the means disposed at the top of the casing further acting as spacing means for keeping the filtering material from closing the inlet opening.

ALBERT R. WHITE.